March 5, 1929.   C. SKLAREK   1,704,225
DIRIGIBLY MOUNTED LIGHT
Original Filed May 28, 1923   2 Sheets-Sheet 2

Inventor:
Clifford Sklarek
By George I. Haight
Attys.

Patented Mar. 5, 1929.

1,704,225

UNITED STATES PATENT OFFICE.

CLIFFORD SKLAREK, OF CHICAGO, ILLINOIS, ASSIGNOR TO INTERNATIONAL SPOT-LIGHT CORPORATION, OF CHICAGO, ILLINOIS, A CORPORATION OF ILLINOIS.

DIRIGIBLY-MOUNTED LIGHT.

Application filed May 28, 1923, Serial No. 641,800. Renewed June 21, 1928.

This invention relates to improvements in dirigibly mounted lights.

One object of my invention is to provide a light, more particularly a spotlight for automobiles and other vehicles, which is universally adjustable by simple and easily operated means, requiring use of only one hand of the operator and a single operating element.

Another object of the invention is to provide an adjustably mounted electric light, and more especially a spotlight for automobiles or other vehicles, wherein is employed means for automatically breaking the electric circuit, when the parts are in a predetermined position, to prevent the light from being thrown in any particular direction to comply with various ordinances and regulations.

A further object of the invention is to provide a light of the character indicated, wherein universal means is provided for attaching the same to the superstructure of the automobile so that the mounting may be arranged at any desired angle.

Another object of the invention is to provide an adjustably mounted electric light, wherein is employed an electric switch of simple construction, so arranged as to be readily accessible and easily operated.

A still further object of the invention is to provide in a light of the character indicated, simple and efficient means for limiting the rotary movement of the light.

A more specific object of the invention is to provide a friction brake in connection with the rotatable mounting for the lamp shell, to prevent the same from being accidentally thrown out of adjusted position.

Other objects and advantages of the invention will more clearly appear from the description and claims hereinafter following.

In the drawings forming a part of this specification.

In said drawings, 21 designates the corner post of the superstructure of a closed type of automobile, or other part of the superstructure, such as a windshield or the like, to which my improved spotlight is adapted to be attached. In the instance shown, the spotlight is primarily designed for use on closed types of cars and readily accessible for operation from the interior of the car at a point convenient to the driver and in proximity to the usual steering wheel.

Figure 4:
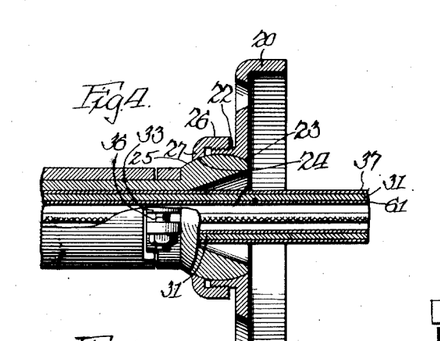
Figure 4 is an enlarged, side elevational view, partly broken away and partly in section, showing the universal mounting for the light at the outer side of the corner post.

In carrying out the invention, I employ a suitable bracket 20 which is secured to the outer side of the corner post 21 by screws or other suitable fastening devices. Said bracket is provided with an outstanding hub 22 threaded on its exterior, and provided with an interior substantially spherical surface 23 adapted to receive the substantially spherical end portion of the tubular bearing sleeve 25, as clearly shown in Figure 4. The latter is held in tightly clamped position with reference to the bracket 20, by an internally threaded clamping collar 26 screwed onto the hub 22 and provided with an inwardly projecting right angular flange 27, having a spherical inner end face engaging the spherical end portion 24 of the tubular bearing sleeve. The spherical portion 24, collar 26 and hub 22 are so proportioned that the flange 27 of the collar is normally spaced from the end of the hub an appreciable distance, so that the collar may be drawn into tight engagement with the spherical portion 24 to force the same tightly against the surface 23 to rigidly clamp the parts and hold the tubular sleeve 25 in fixed position. It will be evident that when the pressure on the spherical portion 25 is relieved by unscrewing the collar 26, the hub 22 and the portion 24 co-act in the manner of a ball and socket joint and the sleeve 25 may be adjusted at any desired angle with reference to the bracket 20 and the post 21.

Rotatably mounted with respect to the support or bracket 20 is what may be termed generally a housing A, carrying the lamp head or shell B, bodily rotatable therewith and also at right angles thereto. Said housing A, as shown, preferably consists of a casting having a main, vertically extending, generally cylindrical section 28, from which is extended laterally a cylindrical tubular sleeve 29, the latter being disposed axially with reference to the sleeve 25 and journaled thereon, as clearly shown in Figure 6. Extending into and rigidly secured to the sleeve 29, as by a screw 30, or other suitable means, is a hollow operating member or arm 31, a spacing collar 32 through which the set screw 30 extends being interposed between the arm and the interior surface of the sleeve 29. As clearly shown in Figure 6, the collar 32 is normally slightly spaced from the outer free end of the bearing sleeve 25.

Rotary movement of the housing A, relatively to the bracket 20 is limited by an adjustable split collar 33, clamped to the tubular bearing sleeve 25, between the spherical portion 24 and the inner end of the sleeve 29, and provided with shoulders 34 co-acting with shoulders 35 on the sleeve 29. The split collar 33 is held in tightly clamped position on the tubular bearing sleeve 25 by a clamping bolt 36 passing through laterally extending lugs on the collar. It will be evident that the collar may be turned to any desired position upon loosening the clamping bolt, to change the position of the shoulders 34 to determine the path of limited rotary movement of the housing A about the axis of the bearing sleeve 25.

Figure 5:
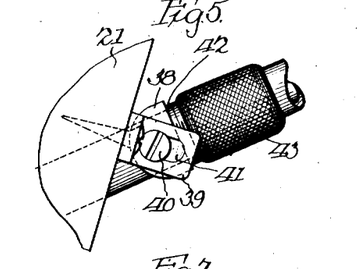
Figure 5 is a side elevational view of the universal mounting for the light at the inner side of the corner post.

The operating member or arm 31 is housed within a snugly fitting tubular casing 37, the front end portion of which is telescoped within the bearing sleeve 25, and terminates flush with the front end of the latter. The casing 37 passes through the post 21 and extends through and is supported by a transversely arranged supporting block 38 pivotally mounted between a pair of angle brackets 39 by means of screws 40 threaded into opposite sides of the block and extending through alined slots 41 in the brackets. The brackets are rigidly secured to the inner side of the post 21 by means of screws, or any other suitable fastening devices. The block 38 is rounded off at the side adjacent the post 21 to properly clear the latter in any position of its pivotal movement and is provided with a rearwardly extending, externally threaded, split conical boss surrounding the casing, as clearly shown in Figure 5. An internally threaded knurled collar 43 slidably mounted on the casing 37 is screwed onto the boss 42, drawing the same together and tightly clamping the casing to the supporting block 38. The supporting means formed by the brackets 39 and the block 38 mounted thereon provides for adjustment of the sleeve at various angles with reference to the post 21 by the pivotal movement of the block, variations in thickness of the post being taken care of by the pivoted screws 40 being adjusted in different positions in the slots 41 of the brackets.

Figure 2:
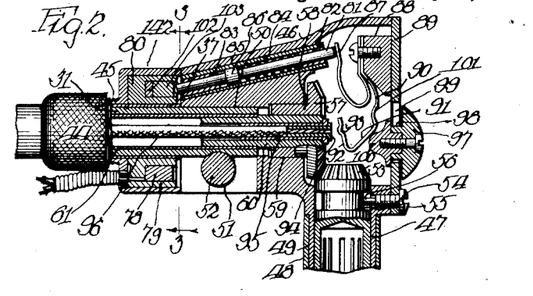
Figure 2 is a vertical, sectional view, on an enlarged scale, partly broken away, of the rear end portion of the improved dirigible light shown in Figure 1.

A cap 142 into which the rear end of the tubular casing 37 extends is secured to the latter by means of a collar 44, similar to the collar 43, having threaded engagement with an outwardly projecting, central, split boss 45 surrounding the casing and formed integral with the cap, as clearly shown in Figure 2.

To operate the spotlight with the utmost convenience, I provide means manipulated by one hand of the operator to effect both the operation of the mechanism for producing bodily swinging movement of the lamp head with the operating arm 31, and the mechanism for producing the independent rotation of the lamp head at right angles thereto. The mechanism for rotating the arm 31 on its axis is most clearly shown in Figure 2, and includes a casting 46 in the form of a housing rigidly secured to the operating arm 31 and provided with a downwardly extending cylindrical sleeve 47 formed integral therewith, the latter being disposed near the rear end of the housing.

An operating hand grip 48, similar to that disclosed in my copending application 611,219 filed January 8, 1923, is secured to the housing, the same being provided with an axial bore 49 adapted to receive the cylindrical sleeve 47, the handle 48 being rotatably mounted on the sleeve for a purpose hereinafter described.

The housing 46 is provided with a bore 50, co-axial with the casing 37, adapted to receive the rear end portion of the operating arm 31. At the forward end, the housing is split as indicated at 51. A clamping screw 52 extending through the split portion and engaging a shallow recess in the arm 31 serves to draw the split portion together and tightly clamp the housing to the arm, the screw co-acting with the recessed portion to assist and preventing relative rotation of the parts. It will be evident that, upon swinging the hand grip 48 in either a right or left hand direction, the arm 31 will be rotated therewith effecting a corresponding swinging movement of the lamp head B with reference to the housing A, which is rigidly connected to the arm as hereinbefore described.

The mechanism for effecting rotation of the lamp head on the axis at right angles to the axis of rotation of the housing A is also operated through manipulation of the hand grip 48, by rotating the latter about the longitudinal axis of the sleeve 47. The mechanism for rotating the lamp head B at right angles to the direction of rotation of the housing includes a beveled gear 53 provided with a stem 54 rotatably mounted in the bore in the sleeve 47, the lower end portion of the stem being rigidly secured to the hand grip in any suitable manner, so that the gear is positively rotated thereby. To rotatably retain the gear 52 and the hand grip in assembled relation with the housing 46, a set screw 55 extending through the lower end of the housing, has its inner end engaged in an annular groove 57 near the upper end of the stem 54. The bevel gear 53 meshes with a second bevel gear 57 provided with a hollow hub 58, rotatably mounted in an enlarged portion 59 of the bore 50 of the housing. The opening of the hub is preferably of rectangular cross section, and the gear 57 is rigidly secured to a short hollow shaft 60 having one end thereof of square cross section and received within the square opening of the gear 57. The opposite end of the shaft 60 projects an appreciable distance beyond the end of the hub and into a relatively long, hollow, operating shaft 61 to which it is rigidly secured.

The operating shaft 61 extends axially through the arm 31 and is rotatably mounted therein, the arm 31 serving as a bearing for the same. The front end portion of the shaft 61, as clearly shown in Figure 6, extends beyond the corresponding end of the arm 31 and into the cylindrical section of the housing A, and has a worm rigidly secured thereto, meshing with a worm gear 62, rigidly secured to a hollow stub shaft 63 formed integral with a stud 64 of relatively larger diameter, integral with or otherwise rigid with respect to the upward extension of the lamp head B. The stud 64 is rotatably mounted in a downwardly extending bearing portion 65 at the lower end of cylindrical section 28 of the housing A and the upper end of the stub shaft portion 63 is rotatably mounted in a bearing 66 in a horizontal partition 67. The latter is formed integral with the housing and has the front end thereof arranged in spaced relation to the front wall of the housing and supported by a vertical post 68 in which the front end of the hollow shaft 61 is journaled.

Figure 6:
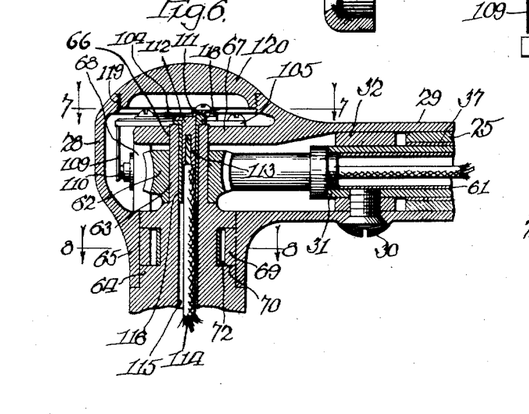
Figure 6 is a vertical, longitudinal sectional view, partly broken away, of the outer end of the housing by which the lamp head or shell is rotatably supported.
Figure 8:
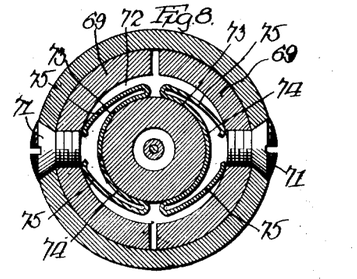
Figure 8 is a horizontal, sectional view corresponding substantially to the line 8—8 of Figure 6.

The lamp head B is retained in assembled relation with the housing A, by a pair of arcuate blocks, working in an annular groove 70 in the stud 64. As best shown in Figures 6 and 8, the blocks 69 are detachably secured to the bearing portion 65 of the housing by a pair of screws 71. When the parts are arranged in assembled relation the blocks 69 form, in effect, a sectional ring and have their inner curved surfaces spaced from the inner wall of the groove 70, thereby providing an annular recess 72.

To provide proper resistance to rotary movement of the head B to prevent the latter from being thrown accidentally out of adjusted position by rattling or jarring, or to prevent over-rotation of the same, a friction brake is provided in connection with the stud 64. The friction brake comprises a pair of opposed plate springs 73 arranged in the recess 72, each of said plates being provided with a curved portion 74 corresponding in curvature to and frictionally engaging with the inner wall of the groove 70 of the stud 64, and a pair of integral arms 75 spaced from the portion 74, extending toward each other and having their ends bearing on the inner face of the adjacent block 69.

In making the electric circuit, I preferably employ the so-called "grounded system," the source of electric energy being derived from the usual storage battery found on automobiles. From the battery are led two insulated wires up to the spotlight as by means of armoured flexible cable 76 held in position by a clamp 77 secured to the casing 37. The end of the negative wire is soldered or otherwise secured to a metal part of the spotlight, preferably to the cap 142, and the end of the positive wire is electrically connected to a metallic contact ring 78 mounted in an annular groove 79 of a ring of insulating material 80 fitted within the cap 142 and surrounding the inner end of the tubular casing 37. A spring controlled slidably mounted, contact pin 81 co-acts with the ring 78. The pin 81 is slidably mounted in a pair of bushings 82 and 83 fixed within the opposite end portions of a sleeve of insulating material 84 fixed within an inclined bore 85 in the casting 46. The inner end of the pin 81 is held in yielding contact with the ring 78 by a spring interposed between the inner end of the bushing 82 and an enlargement 86 on the pin. The outer end of the pin co-acts with a bowed contact spring 87 mounted on a block of insulating material 88 secured to the detachable end wall 89 of the housing 46. The block 88 also carries a spring arm 90 forming a part of a switch, one end of said spring arm being clamped between the adjacent end of the spring 87 and the block by means of a screw passing through said spring.

The spring arm 90 is angularly bent to present an inclined portion 91 and an extension 92 angularly disposed with reference to said inclined portion, and provided with a contact projection 93 adapted to coact with the outer face of a contact member 94 arranged within the rear end of the bore of the hollow shaft 60 and insulated therefrom by an interposed sleeve 95. The contact member 94 is electrically connected with the end of an insulated wire 96 leading to the lamp head. The spring arm 90 of the switch is adapted to be operated to open and close the circuit by a sliding button 97 provided with a shank 98 working in a slot 99 in the end wall 89 and having a rounded block of insulating material 100, co-acting with the inclined portion 91 of the spring, secured thereto by any suitable means such as a screw. The head of the button 97 and the block 100 overlap the sides of the slot and hold the button in operative relation to the wall 89 when the parts are assembled.

Figure 1:
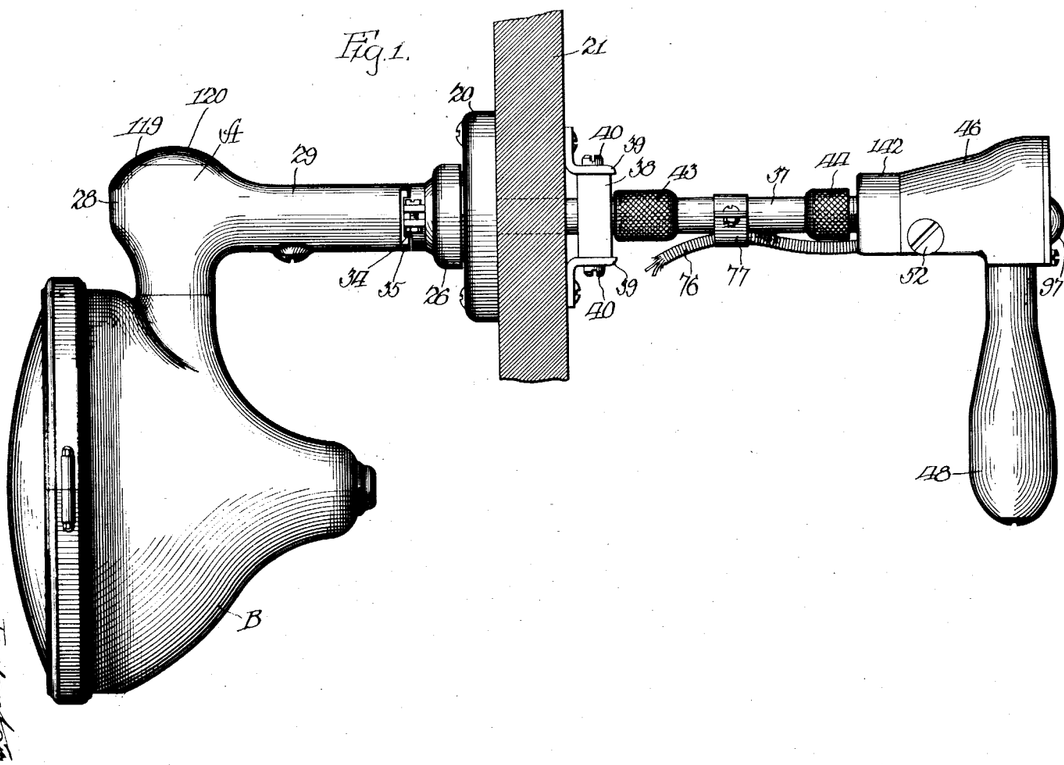
Figure 1 is a vertical, sectional view taken through the corner post of a closed type of automobile superstructure and showing my improvements in side elevation in connection therewith.

In Figure 2, the switch is shown in open position. To close the circuit the button 97 is slid upwardly in the slot and the rounded portion of the block 100, which engages the inclined portion 91 of the spring, forces the end 92 thereof toward the contact member 94, firmly pressing the projection 93 tightly against said block, as the rounded portion of the block 100 passes beyond the inclined portion of the spring. Between the fixed and inclined portion, closely adjacent the latter, the spring 90 is provided with an indentation 101 adapted to co-act with the round portion of the block 100 to yieldingly hold the latter in its extreme position when the switch is closed, the portions of the spring being so proportioned that the projection 93 will be held in firm contact with the member 94 when the rounded portion of the block 100 is seated in the indentation. To open the switch the button 97 is moved in the reverse direction, to the position shown in Figure 1, whereupon the spring arm 90, due to its resilience, returns to the original position, thereby breaking the circuit. It will be evident that the sliding button provides a very convenient means for opening and closing the circuit, the operator being able to manipulate the same by one of his fingers or thumb of the same hand engaging the hand grip 48 without removing the hand from the latter.

Figure 3:
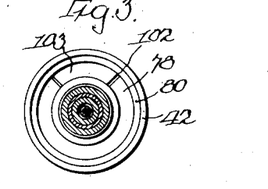
Figure 3 is a transverse sectional view corresponding substantially to the line 3—3 of Figure 2.

In certain cities, ordinances are in effect which restrict the zone of operations of the spotlight. To prevent my spotlight having rays directed within prohibited zones, I employ one, or several of the following means, or any combination thereof depending upon the conditions encountered. Referring first to Figures 2 and 3, it will be noted that a section of the contact ring 78 is cut out as indicated at 102 and replaced by a section of insulating material 103. It will be evident that during rotation of the housing 46 to swing the lamp head to and fro, the pin 81 will complete the circuit as long as the end thereof rides on the surface of the contact ring 78, but that the circuit will be broken when it rides over or rests on the section of insulating material 103, thereby shutting off the light. The block of insulating material is so positioned in the ring that this will occur when the lamp head is swung to a position where rays would be directed within the prohibited zone.

In Figure 2 the parts are shown in the latter position with the circuit broken, the pin being in contact with the section of insulating material. The relative position of the insulating material with reference to the other parts of the light may be adjusted, as desired, to change the point at which the circuit is broken, it being merely necessary to turn the cap 42 and clamp it in any desired position.

Figure 7:
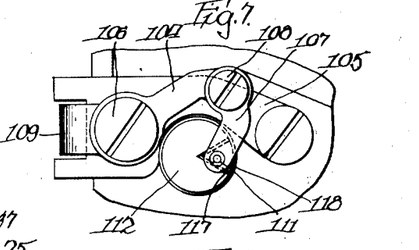
Figure 7 is a horizontal, sectional view corresponding to the line 7—7 of Figure 6, the housing being omitted, and certain parts broken away.

A somewhat similar arrangement to that just described, for making and breaking the circuit, is also employed in connection with the housing A to prevent the rays from being directed within a prohibited zone when the lamp head is rotated on an axis at right angles to the axis of the swinging movement thereof. This arrangement is best shown in Figures 6 and 7, and includes an arm 104 adjustably mounted on a plate of insulating material 105 by means of a screw 106, having a second, relatively shorter, slightly resilient arm 107 adjustably connected thereto for swinging movement, by a screw 108 passing through the overlapping adjacent ends of said arms, the plate of insulating material 105 being rigidly secured to the partition 67, as by a screw or any other suitable means. The arm 104 is electrically connected to the insulated wire 96 extending through the operating shaft 61, by means of a right angular spring contact plate 109 having one arm thereof clamped between the arm 106 and the plate 105 by the screw 106 and having the other arm thereof extending downwardly between spaced lugs on the plate of insulating material and pressing on the face of an insulated plug 110 electrically connected with the end of the wire 96 and fixed within the outer end of the operating shaft 61. The free end of the short arm 107 is provided with a downwardly projecting contact point 111 adapted to ride on the flat upper surface of the head 112 of a plug 113 electrically connected to one end of an insulated wire 114 extending through an axial bore 115 formed in the stub shaft 63 and stud 64 and leading to the lamp proper mounted in the lamp head or shell B. The plug 113 is fixed within a sleeve of insulating material 116 mounted in the upper end of the bore 115 and provided at its upper end with a peripheral flange underlying the head 112 of the plug. A section of the head is cut out as indicated at 117, and the sleeve of insulating material is provided with a corresponding integral projection 118 of sector shape fixed within said cut out portion and projecting slightly above the upper face of the head 112. It will be evident that during the rotation of the shaft 63, to turn the lamp head to and fro, the plug 113 will be rotated therewith and the contact point 111 on the arm 107 will ride over the surface of the head and sector of insulation 118. During the time that the point rides over the head 113, the circuit will be closed, but when the point travels over or rests upon the sector 118, as shown in Figures 6 and 7, the circuit will be broken, thereby shutting off the light. The sector of insulating material 118 will be so positioned with reference to the other parts that the circuit will be broken when the lamp head is turned to a position where the rays would be directed within a prohibited zone.

The relative position of the arm 104 and the sector 118 may be adjusted to suit conditions by loosening the screws 106 and 108 and adjusting the free end of the arm 104, as desired, toward or away from the arm 112, and moving the free end of the arm 107 into proper position over the head 112. Access to properly adjust the parts is had through an opening 119 at the top of the housing A closed by a removable cap 120.

In the manufacture, shipping and assembling of my improved device, I prefer to adopt the following procedure. The casting 37, the arm 31, the hollow shaft 61, the bracket 20, and all other parts to the left of the bracket 20 as viewed in Figure 1 will be assembled as one unit and so shipped. In assembling the device, it is only necessary to bore a hole through the post 21, whereupon the said unit may be assembled with the post and the bracket 20 secured in place by the screws provided for that purpose. Next, the bracket comprising the parts 38 and 39 is slipped over the casting 37 and secured to the post by means of screws provided for that purpose; then the jam nut 43 is screwed home. Next, the collar 142 and the parts contained therein are applied and a connection made with the cable 76. The handle supporting casting or housing 46 is assembled, shipped and applied as a unit, the same carrying the contact pin 81, the switch button 97, a spring arm 101, hand grip 48 and the beveled gears 53 and 57 so that, when slipped over the extended end of the arm 31, gear 57 will make non-rotatable connection with the square portion of the hollow shaft 60. The casting 46 is then tightly clamped to the operating arm 31 by tightening the screw 52. By adopting this procedure, it is evident that the device may be applied to a car without the aid of skilled labor and the only tools needed are a screw driver and the means for drilling the necessary hole through the post.

From the preceding description it will be seen that I have provided a spotlight of exceedingly simple construction, wherein adjustable automatic means is provided for breaking the circuit and shutting off the light when the lamp head is rotated beyond a certain limit on either a horizontal or vertical axis, to a position where the rays would be directed within a prohibited zone.

It will also be evident that by providing the universally adjustable brackets for mounting the spotlight, the same may be secured at any desired angle with reference to the steering wheel or corner post of an automobile superstructure, and that the mounting is further adapted to posts of different thickness, cross-section and slant.

I have herein shown and described what I now consider the preferred manner of carrying out the invention, but the same is merely illustrative, and I contemplate all changes and modifications that come within the scope of the claims appended hereto.

I claim:

1. In a dirigible light, the combination with a relatively fixed supporting means; of a shaft rotatably mounted on said means to turn about one axis; a light carrying member supported from said shaft and disposed at an angle thereto; means for effecting rotation of said shaft and said member; an electric circuit; means, comprising a relatively fixed member and a member movable with said rotary shaft, said last named members being adjustable relatively to each other, said means being adapted to permit free movement of said parts to their various positions of adjustment without disarrangement.

2. In a dirigible light, the combination with a relatively fixed supporting means; of a light carrying member movably supported by said means; mechanism for effecting rotation of said member about the axes at right angles to each other; an electric circuit; and means for automatically making and breaking the circuit, including an arm and a rotatable contact element co-acting with said arm, said element being provided with a section of insulation adapted to co-act with said arm during the rotation of said element; and means for adjusting said arm with respect to said element to vary the point at which the circuit is broken.

3. In a dirigible light, the combination with a relatively fixed supporting means including a tubular bearing member; of a shaft rotatably mounted within said tubular member; a relatively fixed contact ring having a section thereof formed of insulating material, said ring being insulated and mounted upon said bearing member; a handle supporting member rigid with said shaft on the end adjacent the contact ring; and a spring controlled contact pin carried by said handle supporting member and co-operable with said contact ring; and means for adjusting said contact ring.

4. In a dirigible light, the combination with a relatively fixed supporting means; of a shaft rotatably supported on said means to turn about one axis; a light carrying member rotatably supported from said shaft to turn about a different axis; and a friction brake, including a pair of spring members interposed between said shaft and light carrying member.

5. In a dirigible light, the combination with a relatively fixed supporting means, including a tubular bearing sleeve; a hollow shaft rotatably mounted within said tubular bearing sleeve; a second shaft rotatably mounted within said first named shaft; a relatively fixed contact ring insulated from and mounted upon said sleeve; a handle supporting member rigid with said first named shaft on the end thereof adjacent the contact ring; a spring control contact pin carried by said handle supporting member and co-operable with said contact ring; an electric conductor mounted within said second named shaft; and a switch carried by said handle supporting member and co-acting with said pin and said electrical conductor, said switch including a sliding button co-acting with a resilient switch arm.

6. In a dirigible light, the combination with a relatively fixed supporting means; of a shaft rotatably mounted on said means to turn about one axis; an electric light carrying member rotatably supported from said shaft to turn about a different axis; a handle support rigidly secured to said shaft; a handle rotatably mounted on said support and extending radially therefrom with respect to said shaft; operative connections between said handle and member for effecting rotation of the latter; and an electric circuit including a switch mounted in said handle support, said switch being operated by a sliding button mounted closely adjacent said handle.

7. In a dirigible light, the combination with a relatively fixed supporting means, including a tubular bearing sleeve; of a hollow shaft rotatably mounted within said tubular sleeve; a second shaft rotatably mounted within said first named shaft; a relatively fixed contact ring insulated from and mounted upon said bearing sleeve; a handle supporting member rigid with said first named shaft on the end of said shaft adjacent the contact ring; a spring controlled contact pin carried by said handle supporting member and co-operable with said ring; an electric conductor mounted within said second named shaft; and a switch carried by said handle supporting member, said switch including a spring arm having electric connection with the pin and adapted to contact with said conductor, and a sliding operating button adapted to engage an inclined portion of said spring arm to force the latter into contact with said conductor.

8. In a dirigible light, the combination with a supporting means; of a universal mounting for said supporting means, said mounting including a ball and socket joint adapted to be attached to the outer side of a supporting wall, and a member adapted to be pivotally secured to the inner side of said wall; a shaft rotatably mounted on said means to turn about one axis; a light carrying member rotatably supported from said shaft to turn about a different axis; and means for effecting independent rotation of said shaft and member about their respective axes, said means including a handle support rigid with said shaft, a handle rotatably mounted on said support, and an operating connection between said handle and member.

9. In a dirigible light, the combination with a tubular supporting member from which the light carrying member is rotatably supported; of means for mounting said supporting member including a bracket adapted to be secured to the outer side of a supporting wall and connected to said member by a ball and socket joint; and a second bracket adapted to be secured to the inner side of said wall, and connected to said member by a block pivotally and slidably adjustable relative to said last named bracket.

10. In a dirigible light, the combination with a support; of a bracket adapted to be secured to one side of said support and providing the socket of a ball and socket joint; supporting means having a ball portion confined to one side of said support and adjustably held in said bracket; a housing rotatably supported on said means to rotate about one axis; a shaft rotatably mouned in said tubular supporting means and rigidly connected to said housing; a light carrying member rotatably supported from said housing to turn about a different axis; and means for effecting independent rotation of said shaft and member about their respective axes.

11. In a dirigible light, the combination with a tubular supporting means; of a bracket adapted to be secured to the outer side of a supporting wall, said bracket and means being connected by a ball and socket joint; means for clamping said joint in fixed position; a housing rotatably supported on said supporting means to rotate about one axis, said housing being provided with a stop shoulder; a split collar clamped to said tubular supporting means, said collar being provided with spaced stop shoulders co-acting with the co-operating shoulders on said housing to limit the rotation of the latter; a shaft rotatably mounted on said means and rigidly connected to said housing; a light carrying member rotatably supported from said housing to turn about a different axis; and means for effecting independent rotation of said shaft and member about their respective axes.

12. In a dirigible light, the combination with a relatively fixed supporting means; of a shaft rotatably mounted on said means to turn about one axis; a light-carrying member rotatably supported from said shaft to turn about a different axis; means for effecting independent rotation of said shaft and member about their respective axes; an electric circuit; means for alternately making and breaking the circuit upon actuation of one of said rotation effecting means, said means comprising interengaging elements on said supporting means and shaft, and other means for making and breaking the circuit when the parts are actuated by the other of said independent rotation effecting means, said other means comprising inter-engaging elements supported by said shaft and light carrying member, said circuit making and breaking mechanism being arranged to operate to restrict the zones of light within predetermined limits.

13. In a dirigible light, the combination with a relatively fixed supporting means; of a shaft rotatably mounted on said means to turn about one axis; a light-carrying member rotatably supported from said shaft to turn about a different axis; means for effecting independent rotation of said shaft and member about their respective axes; an electric current; means for alternately making and breaking the circuit upon actuation of one of said rotation effecting means, and other means for making and breaking the circuit when the parts are actuated by the other of said independent rotation effecting means, said circuit making and breaking mechanism being arranged to operate independently to restrict the zones of light within similar limits, said circuit making and breaking mechanisms being adjustable to vary the distribution of the light zones to predetermined positions.

14. In a dirigible light, the combination with a rotatable light operating member; means for operating said member; a circuit making and breaking device associated with said rotatable member, said means including a contact device capable of adjustment in a plurality of directions to vary the contact of the same with said rotatable member.

15. In a dirigible light, the combination with a relatively fixed supporting means; of a light-carrying member rotatably mounted upon said means; means for rotating said member; and a friction brake including spring members interposed between said light-carrying member and said supporting means, said spring members being laterally expansible relatively to said light-carrying member and said supporting means.

16. In a dirigible light, the combination with a universally mounted tubular bearing sleeve; and of a cylindrical tubular sleeve and a cylindrical casing fitting upon the inner and outer surfaces of said bearing sleeve, said casing being connected to said cylindrical sleeve and being adapted for use as an operating member; and a light carrying member connected adjacent the free end portion of said cylindrical sleeve.

17. In a dirigible light, the combination with a relatively fixed supporting means; of a shaft rotatably mounted on said means to turn about one axis; a light carrying member rotatably supported from said shaft to turn about a different axis; and means for effecting independent rotation of said shaft and member about their respective axes, said means including a handle support rigid with said shaft and provided with an opening to the rear of the end of said shaft to accommodate a switch; a handle extending into said support at an angle to said shaft and being rotatably supported for rotating said shaft; an electric circuit; and contact means including a contact ring and contact pin, said contact means being arranged to effect making and breaking of said circuit upon swinging movement of said handle support.

18. In a dirigible light, the combination with a support; of an operating arm rotatably mounted on said support to turn about one axis, said arm extending beyond said support at each side thereof; a light carrying member connected to said arm adjacent one end thereof and rotatable about an axis different from the axis of rotation of said arm; means associated with the opposite end of said arm for effecting independent rotation of said arm and said light carrying member about their respective axes; an electric circuit including contact means arranged adjacent one end of said arm and adapted to co-act with said light carrying member for alternately making and breaking the circuit upon actuation of said rotation effecting means to rotate said light carrying member upon its axis; and additional contact means co-operating with said arm to effect alternate making and breaking of said circuit upon actuation of said rotation effecting means to rotate said arm upon its axis.

19. In a dirigible light, the combination with a relatively fixed supporting means; of a hollow arm rotatably mounted on said supporting means to turn about one axis, said hollow arm projecting beyond said supporting means at either side thereof, and one end of said hollow arm having a hollow head associated therewith; a lamp carrying member rotatably supported from said head to turn about an axis at an angle to said first axis; an electric circuit; an actuating shaft extending through said hollow arm and adapted to effect rotation of said lamp carrying member upon its axis, said actuating shaft being adapted to house a conductor extending therethrough, and said lamp carrying member being provided with a conducting element; contact means connecting said shaft and said lamp carrying member for completing the circuit through said shaft and said member; means for alternately making and breaking said circuit upon rotation of said lamp carrying member; and means for rotating said arm and said shaft.

20. In a dirigible light, the combination with a relatively fixed supporting means; of a hollow arm rotatably mounted on said supporting means to turn about one axis, said hollow arm projecting beyond said supporting means at either side thereof, and one end of said hollow arm having a head associated therewith; a lamp carrying member rotatably supported from said head to turn about an axis at an angle to said first axis; an electric circuit; an operating shaft extending through said arm and adapted to effect rotation of said lamp carrying member upon its axis, said shaft being adapted to house a conductor extending therethrough, and said lamp carrying member being provided with conducting means; and contact means connecting the conducting means of said operating shaft and of said lamp carrying member; means for alternately making and breaking said circuit upon rotation of said lamp carrying member, and means for effecting independent rotation of said arm and said shaft; and contact making and breaking means associated with said arm whereby rotation of the latter effects making and breaking of said circuit independently of said first making and breaking means.

21. In a dirigible light, the combination with a supporting wall having an aperture therethrough; of a bracket secured to the outer side of said wall and provided with a spherical surface; a lamp and a hollow member connected with said lamp, said hollow member projecting from the outer side of said wall, extending through the aperture therein, and projecting beyond the inner side of said wall, said lamp being supported for rotation about the axis thereof; a device disposed outwardly of said wall and secured thereto and having means for supporting said hollow member, at one side of said wall, said means including a spherical surface co-operatively engaging the spherical surface on said bracket; and an element bearing against the opposite side of said wall and disposed about said hollow member for supporting the same at the opposite side of said wall.

22. In a dirigible light, the combination with a supporting wall having an aperture therethrough; of a bracket secured to the outer side of said wall and provided with a spherical surface; a lamp and a hollow member connected with said lamp, said hollow member projecting from the outer side of said wall, extending through the aperture therein, and projecting beyond the inner side of said wall, said lamp being supported for rotation about the axis thereof; a device disposed outwardly of said wall and secured thereto and having means for supporting said hollow member, at one side of said wall, said means including a spherical surface co-operatively engaging the spherical surface on said bracket; an element bearing against the opposite side of said wall and disposed about said hollow member for supporting the same at the opposite side of said wall; a shaft rotatably mounted in said hollow member, and having means at its forward end co-operating with said lamp whereby rotation of said shaft effects rotation of said lamp; and means for independently rotating said hollow member and said shaft.

23. In a dirigible light, the combination with a supporting wall having an aperture therethrough; of a bracket secured outwardly of said wall and provided with a spherical surface; a lamp and a hollow member connected to said lamp, said member projecting outwardly from the outer side of said wall extending through the aperture in said wall and projecting beyond the opposite side of said wall; a device for supporting said hollow member, said device including means providing a spherical surface adapted for co-operation with the spherical surface of said bracket; a rotatable shaft extending through said hollow member and operatively connected with said lamp, whereby rotation of said shaft effects rotation of said lamp about its axis; means connected to said hollow member for rotating said lamp and said member about the axis of said member; and means connected with said shaft for rotating the same independently of said hollow member.

24. In a dirigible light, the combination with the structure of a closed automobile having an aperture threthrough; of a lamp and a hollow member connected with said lamp, said member projecting through said aperture to opposite sides of said structure; a rotatable shaft extending through said hollow member and operatively connected with said lamp whereby rotation of said shaft effects rotation of said lamp about one axis; operating means connected to said hollow member and said lamp for rotating said lamp about a different axis than that first mentioned; a bracket member mounted on said structure; a device co-operating with said bracket member to support said hollow member in position for rotation, said device and bracket member being relatively movable to permit adjustment of said hollow member at various angles with reference to said structure; and securing means for rigidly holding said bracket member and said device against relative movement when the desired adjustment of said hollow member with reference to said structure is obtained.

25. In a dirigible light, the combination with a supporting wall having an aperture therethrough; of a bracket secured at one side of said wall and provided with a spherical surface; a lamp and a hollow member connected with said lamp, said member projecting outwardly from the outer side of said wall extending through the aperture in said wall and projecting beyond the opposite side of said wall; a device for supporting said hollow member, said device including means providing a spherical surface adapted for co-operation with the spherical surface of said bracket; a rotatable shaft extending through said hollow member and operatively connected with said lamp whereby rotation of said shaft effects rotation of said lamp about one axis; means connected to said hollow member for rotating said lamp about a different axis; and means connected with said shaft for rotating the latter independently of said hollow member.

In witness that I claim the foregoing I have hereunto subscribed my name this 21st day of May, 1923.

CLIFFORD SKLAREK.